US007201881B2

(12) United States Patent
Cox et al.

(10) Patent No.: US 7,201,881 B2
(45) Date of Patent: Apr. 10, 2007

(54) ACTUATOR FOR DEFORMABLE VALVES IN A MICROFLUIDIC DEVICE, AND METHOD

(75) Inventors: David M. Cox, Foster City, CA (US); Zbigniew T. Bryning, Campbell, CA (US)

(73) Assignee: Applera Corporation, Foster City, CA (US)

(*) Notice: Subject to any disclaimer, the term of this patent is extended or adjusted under 35 U.S.C. 154(b) by 494 days.

(21) Appl. No.: 10/403,640

(22) Filed: Mar. 31, 2003

(65) Prior Publication Data

US 2004/0131502 A1 Jul. 8, 2004

Related U.S. Application Data

(63) Continuation-in-part of application No. 10/336,274, filed on Jan. 3, 2003, and a continuation-in-part of application No. 10/336,706, filed on Jan. 3, 2003.

(60) Provisional application No. 60/398,851, filed on Jul. 26, 2002, provisional application No. 60/398,946, filed on Jul. 26, 2002, provisional application No. 60/398,777, filed on Jul. 26, 2002.

(51) Int. Cl.
*B01L 3/02* (2006.01)
*G01N 1/10* (2006.01)

(52) U.S. Cl. .......................... 422/100; 422/58; 422/63; 422/64; 436/180

(58) Field of Classification Search .......... 422/99–100, 422/63–64, 58; 436/180
See application file for complete search history.

(56) References Cited

U.S. PATENT DOCUMENTS 4,399,103 A * 8/1983 Ferrara ....................... 422/100
5,061,446 A * 10/1991 Guigan ........................ 422/64
5,110,552 A * 5/1992 Guigan ........................ 422/64
5,154,888 A * 10/1992 Zander et al. ................ 422/58
5,229,297 A * 7/1993 Schnipelsky et al. ......... 436/94
5,254,479 A 10/1993 Chemelli
5,256,376 A 10/1993 Callan et al.
5,288,463 A 2/1994 Chemelli
5,290,518 A 3/1994 Johnson
5,422,271 A * 6/1995 Chen et al. .............. 435/287.2
5,460,780 A * 10/1995 Devaney et al. .............. 422/99
5,804,141 A 9/1998 Chianese
5,811,296 A 9/1998 Chemelli et al.
6,048,734 A 4/2000 Burns et al. ................ 436/180

(Continued)

FOREIGN PATENT DOCUMENTS

WO WO 95/02456 1/1995

(Continued)

OTHER PUBLICATIONS

International Search Report, mailed Jan. 8, 2004, for International Application No. PCT/US03/22459.

(Continued)

*Primary Examiner*—Brian R. Gordon
(74) *Attorney, Agent, or Firm*—Kilyk & Bowersox, P.L.L.C.

(57) ABSTRACT

A combination is provided that includes a microfluidic device and a pivoting actuator. Methods of using the combination are also provided. The microfluidic device can include deformable valves that can be opened, for example, by the pivoting actuator.

17 Claims, 4 Drawing Sheets

U.S. PATENT DOCUMENTS

| | | | | |
|---|---|---|---|---|
| 6,068,751 | A | 5/2000 | Neukermans | 204/601 |
| 6,102,897 | A | 8/2000 | Lang | 604/246 |
| 6,300,138 | B1 | 10/2001 | Gleason et al. | |
| 6,302,134 | B1 | 10/2001 | Kellogg et al. | 137/74 |
| 6,375,871 | B1 * | 4/2002 | Bentsen et al. | 264/1.6 |
| 6,375,901 | B1 | 4/2002 | Robotti et al. | 422/103 |
| 6,379,929 | B1 | 4/2002 | Burns et al. | 435/91.2 |
| 6,390,791 | B1 | 5/2002 | Maillefer et al. | 417/413.3 |
| 6,408,878 | B2 | 6/2002 | Unger et al. | 137/597 |
| 6,426,230 | B1 | 7/2002 | Feistel | |
| 6,431,212 | B1 | 8/2002 | Hayenga et al. | 137/855 |
| 6,494,433 | B2 | 12/2002 | Mastrangelo et al. | 251/11 |
| 6,627,159 | B1 | 9/2003 | Bedingham et al. | |
| 6,645,758 | B1 | 11/2003 | Schnipelsky et al. | |
| 6,761,962 | B2 * | 7/2004 | Bentsen et al. | 428/188 |
| 6,810,713 | B2 * | 11/2004 | Hahn et al. | 73/23.35 |
| 6,814,935 | B2 * | 11/2004 | Harms et al. | 422/99 |
| 7,056,473 | B2 * | 6/2006 | Harris et al. | 422/63 |
| 7,056,475 | B2 * | 6/2006 | Lum et al. | 422/100 |
| 2001/0029983 | A1 | 10/2001 | Unger et al. | 137/597 |
| 2001/0033796 | A1 | 10/2001 | Unger et al. | 417/53 |
| 2001/0054778 | A1 | 12/2001 | Unger et al. | 264/239 |
| 2002/0029814 | A1 | 3/2002 | Unger et al. | 137/824 |
| 2002/0043638 | A1 | 4/2002 | Kao et al. | 251/129.06 |
| 2002/0048533 | A1 * | 4/2002 | Harms et al. | 422/99 |
| 2002/0054835 | A1 | 5/2002 | Robotti et al. | 422/103 |
| 2002/0064885 | A1 | 5/2002 | Bedingham et al. | 436/174 |
| 2002/0100714 | A1 | 8/2002 | Staats | |
| 2002/0117517 | A1 | 8/2002 | Unger et al. | 222/214 |
| 2002/0144738 | A1 | 10/2002 | Unger et al. | 137/824 |
| 2002/0148992 | A1 | 10/2002 | Hayenga et al. | 251/61.1 |
| 2002/0168278 | A1 | 11/2002 | Jeon et al. | 417/559 |
| 2002/0187560 | A1 | 12/2002 | Pezzuto et al. | |
| 2002/0195579 | A1 | 12/2002 | Johnson | 251/11 |
| 2003/0143754 | A1 | 7/2003 | Lum et al. | |
| 2003/0228242 | A1 | 12/2003 | Feygin | |
| 2005/0031494 | A1 * | 2/2005 | Harms et al. | 422/99 |

FOREIGN PATENT DOCUMENTS

| | | |
|---|---|---|
| WO | WO 97/21090 | 6/1997 |
| WO | WO 97/27324 | 7/1997 |
| WO | WO 03/015923 A1 | 2/2003 |

OTHER PUBLICATIONS

Supplementary European Search Report mailed Jul. 18, 2005, 2 pages.

* cited by examiner

ACTUATOR FOR DEFORMABLE VALVES IN A MICROFLUIDIC DEVICE, AND METHOD

CROSS-REFERENCE TO RELATED APPLICATIONS

This application is a continuation-in-part of U.S. patent application Ser. No. 10/336,274 flied Jan. 3, 2003, which claims the benefit of U.S. Provisional Patent Application No. 60/398,851, filed Jul. 26, 2002, is a continuation-in-part of U.S. patent application Ser. No. 10/336,706, filed Jan. 3, 2003, and claims the benefit of U.S. Provisional Patent Applications Nos. 60/398,851, 60/398,777 and 60/398,946, all filed Jul. 26, 2002. All U.S. patent applications and U.S. Provisional Patent Applications mentioned herein are incorporated herein in their entireties by reference.

FIELD

The present invention relates to microfluidic devices, and methods and systems for using such devices. More particularly, the present invention relates to devices and methods that allow for the manipulation, processing, and alteration of micro-sized amounts of fluids and fluid samples through microfluidic devices.

BACKGROUND

Microfluidic devices are useful for manipulating micro-sized fluid samples. There continues to exist a demand for devices, systems for actuating a plurality of deformable portions of microfluidic devices, such as deformable valves, and methods of using them, in a quick, efficient, and reproducible manner, to efficiently process a respective plurality of micro-sized fluid samples.

SUMMARY

According to various embodiments, a deforming system is provided that includes a pivotable actuator for deforming deformable portions of a microfluidic device, such as a microfluidic microcard device. The pivotable actuator includes a plurality of deforming blades, each deforming blade includes a blade tip end and an opposite end. The deforming blades can have an opening blade design or can be configured as, for example, a hole-punch. The pivotable actuator also includes a presser member that is capable of pivoting about an axis of rotation to actuate the plurality of deforming blades. The plurality of deforming blades can be a plurality of teeth on an outer peripheral edge of a pivotable member having a unitary construction with the blade tip ends. According to various embodiments, the plurality of blade tips can be separate and distinct from one another, arranged in a linear array in a cartridge, and actuated by the presser member. In such embodiments, the presser member can be a roller and the cartridge can be provided with a guide track to guide the roller into contact with the plurality of opposite ends of the deforming blades. According to various embodiments, a combination is provided that includes the pivotable actuator and a microfluidic device. The combination can further include a platform, for example, as part of an apparatus, that can provide a holder for positioning a microfluidic device with respect to the pivotable actuator. The combination can include a holder that positions the microfluidic device between the presser member and the plurality of deforming blades.

These and other embodiments can be more fully understood with reference to the accompanying drawing figures and the descriptions thereof Modifications that would be recognized by those skilled in the art are considered a part of the present teachings and within the scope of the appended claims.

DETAILED DESCRIPTION OF THE INVENTION

According to various embodiments, a deforming device, system, and method are provided for quickly, efficiently, and reproducibly deforming deformable portions of a microfluidic device. The deformable portions of the microfluidic device can include deformable valves that can be opened and closed, for example. The deforming device and deforming system can include a plurality of deforming blades, and each blade can include a blade tip end and an opposite end. The pivotable actuator can include a roller operatively arranged to roll and sequentially actuate the opposite ends of the plurality of deforming blades to sequentially actuate the deforming blades. A system can be provided to arrange the plurality of deforming blades adjacent a microfluidic device such that when the deformable blades are sequentially actuated by the pivotable actuator the deformable portions of the microfluidic device can be sequentially deformed.

According to various embodiments, the pivotable actuator can include a roller having an outer periphery and a plurality of gear teeth arranged sequentially along the outer periphery. An actuator mechanism can be operatively attached to the roller and can be capable of rolling the roller across the card with a sufficient force such that each of the plurality of teeth sequentially deform the deformable portion of the card. The deforming blades can be housed in a cartridge and the cartridge can include a guide track for guiding the roller into contact with the plurality of opposite ends of the deforming blades.

According to various embodiments, a combination can be provided that includes a deforming device as described herein and a microfluidic device having deformable portions. The pivoting actuator can be arranged on a first side of the microfluidic device and the deforming blades can be arranged on the same side or on an opposite side of the microfluidic device. The combination roller can include a roller operatively arranged to roll against a first side of the microfluidic device and force the plurality of deforming blades to sequentially deform an opposite side of the microfluidic device.

Methods are also provided for deforming a microfluidic device by using the deforming devices, systems, and combinations described herein.

Figure 1:
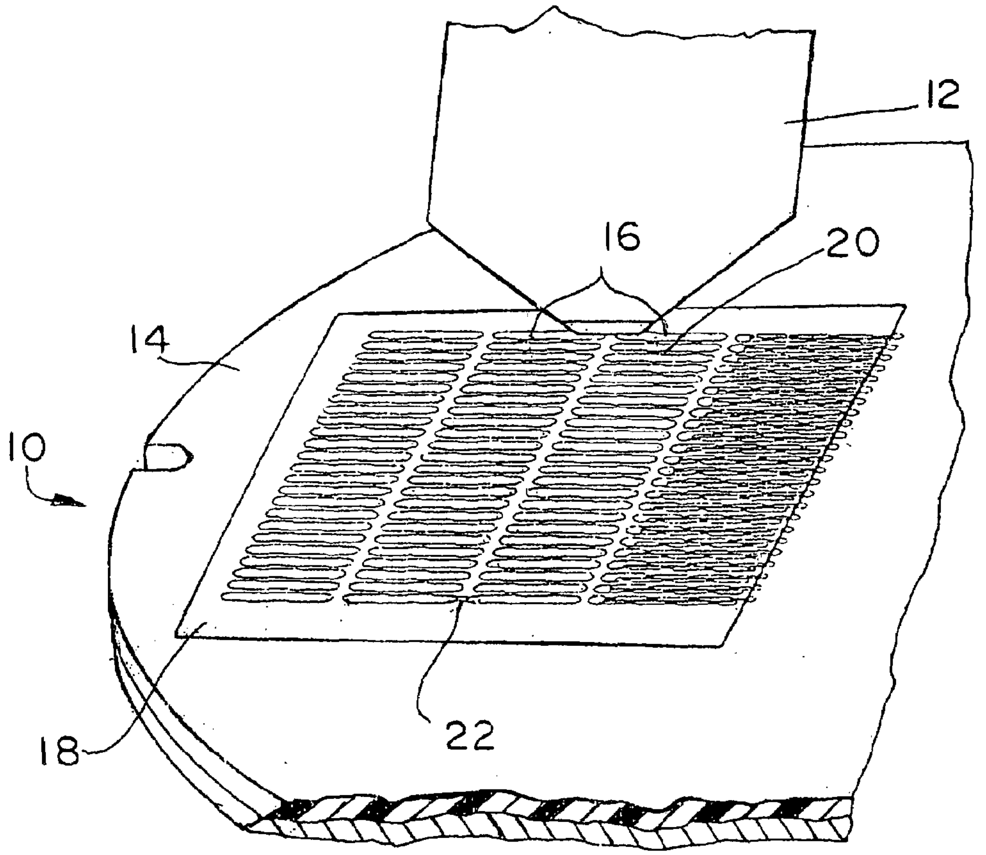
FIG. 1 is a perspective view of a microfluidic device being deformed by an opening blade according to various embodiments.
Figure 2:
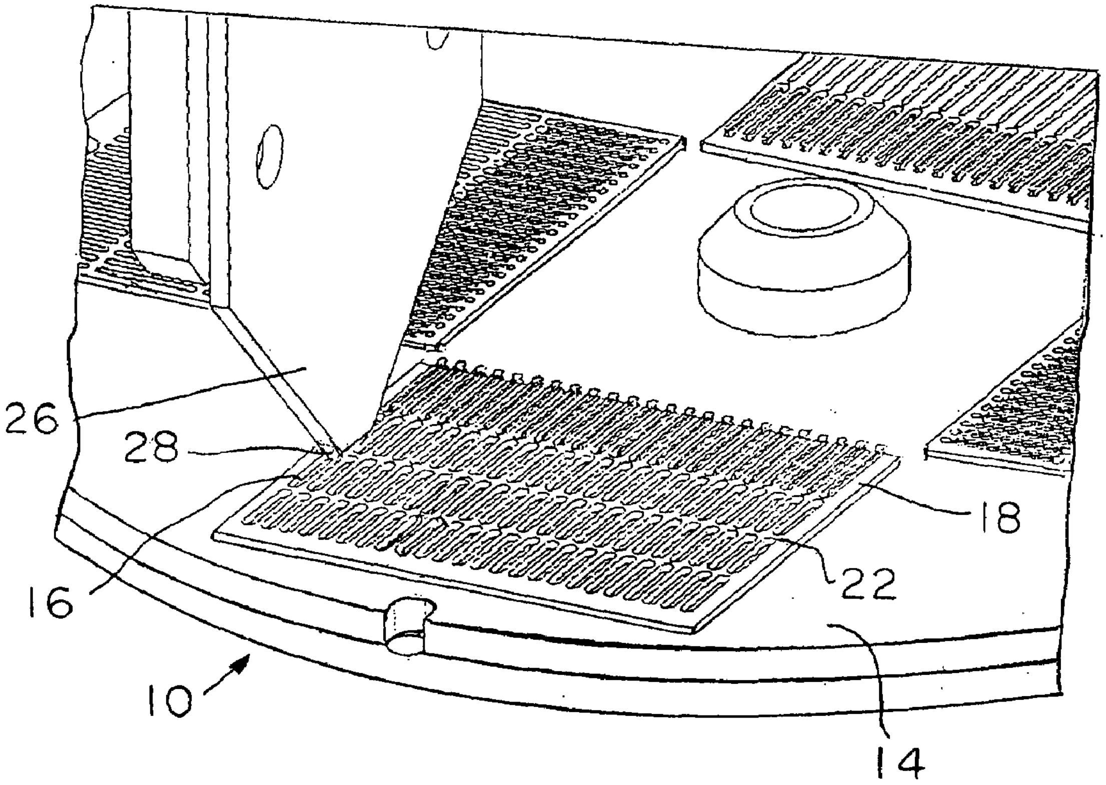
FIG. 2 is a perspective view of a microfluidic device being deformed by a closing blade according to various embodiments.

With reference to the drawings, FIGS. 1 and 2 are perspective views of a microfluidic device 10 that can be deformed by an opening blade 12, for example, to provide a communication between two chambers in the device. The microfluidic device 10 can include a substrate 14, having for example, a disk-shape. The substrate 14 can include at least one surface having a plurality of sample wells 16 formed therein. A surface of the substrate 14 formed with sample wells 16 can be covered with a sheet 18 of, for example, plastic that can be held to the disk 14 with an adhesive, glue, or any other suitable attachment mechanism, for example, a heat weld. Various embodiments of exemplary microfluidic devices are disclosed in greater detail in U.S. patent application Ser. No. 10/336,274, filed Jan. 3, 2003, entitled "Microfluidic Devices, Methods, and Systems" to Bryning et al., the contents of which are herein incorporated by reference in their entirety.

As shown in FIG. 1, when it is desired to transfer a sample from one well 16 to another, the opening blade 12 can be forced into contact with the microfluidic device 10. The blade tip end 20 of the opening blade 12 can be shaped to form a depression in an area between the sample wells 16, preferably by elastically deforming, without cutting-through, the sheet 18, to thereby create a gap or channel between the sheet 18 and the underlying disk 14. The area between the wells can include a deformable portion or portions 22 such as a deformable intermediate wall, such as, for example, a Zbig valve as described in U.S. patent application Ser. No. 10/336,274. The deformable portion or portions 22 such as a Zbig valve can be opened and/or closed with one or more deforming blades, for example.

The creation of the channel by the opening blade 12 can open the Zbig valve or other deformable portion or portions 22 allowing a sample to move through the resultant fluid communication between the wells 16. According to various embodiments, when the Zbig valve or other deformable portion or portions 22 is open, the sample can be forced to move through the communication between the sample wells 16 by way of centripetal or gravitational force, for example. Specifically, the microfluidic device can be spun to force the sample to move to a radially-configured outer well with respect to the axis of rotation used for spinning.

Figure 3:
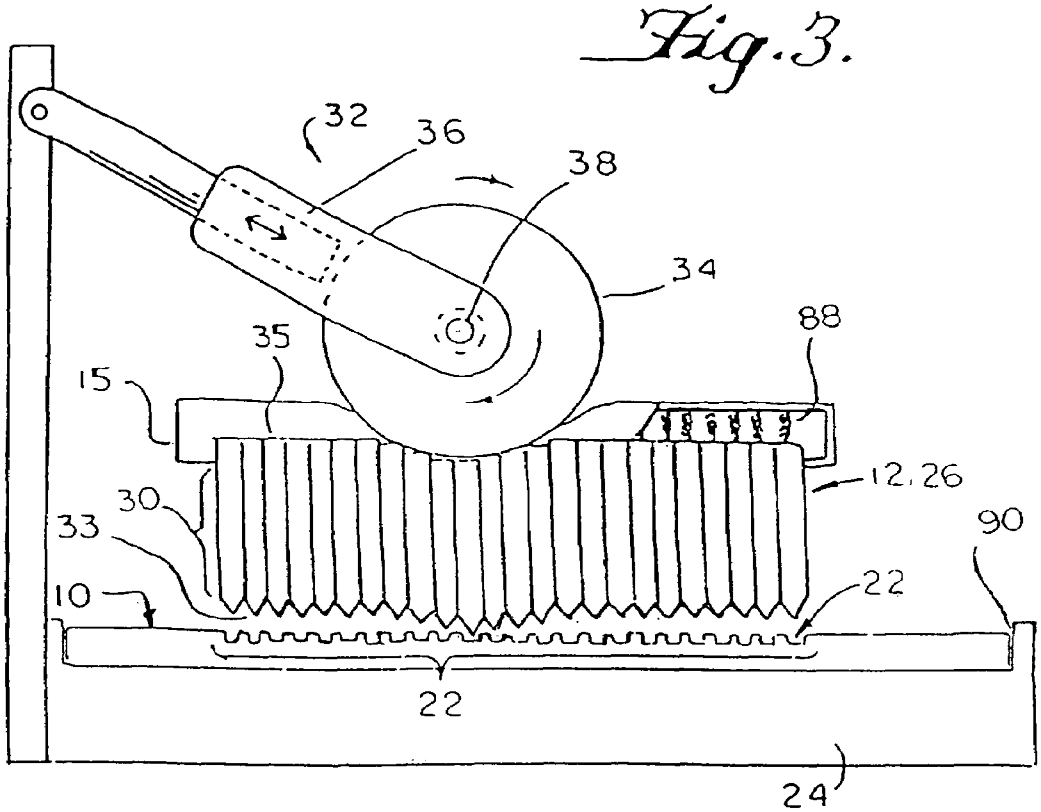
FIG. 3 is a side view of a rolling actuator apparatus according to various embodiments, including a roller assembly comprising a cylindrical roller that rolls along a stack of blades arranged in a cartridge, and sequentially deforming a microfluidic device.

According to various embodiments, the microfluidic device 10 including the sample wells 16 and deformable portion or portions 22, can be in the form of a card or microcard 10 which can be contacted with a plurality of stacked deforming blades 30 as shown, for example, in FIG. 3. The stacked blades can be arranged and operatively held in a cartridge 15. According to various embodiments, a supporting device or platform 24, such as, for example, a supporting platen having a holder in the form of a recess 90, can be used to support and hold the card or microcard 10 during at least a deforming operation.

According to various embodiments, and as shown in FIG. 2, the deforming blade can be a closing blade 26 that is useful for closing a deformable portion or portions 22, such as a Zbig valve, in a microfluidic device. According to various embodiments, the Zbig valve or other deformable portion or portions 22 can be inelastically deformed when contacted by a blade tip end 28 of the deforming closing blade 26. For example, the blade tip end 28 can be shaped to cause the material of the disk 14 to plastically deform or cold-form into the channel of an open Zbig valve or other deformable portion or portions 22, thereby closing the Zbig valve or other deformable portion or portions 22. Further details of such closing blades and methods are set forth in U.S. patent application Ser. No. 10/336,274. According to various embodiments, the substrate 14 of the microfluidic device can be struck on either or both sides of an open Zbig valve or other deformable portion or portions 22 with the closing blade 26. The closing blade 26 can inelastically deform the deformable portion or portions 22 of the microfluidic device substrate 14 causing the fluid communication through the open valve to close. According to various embodiments, the two opposing sides of the open Zbig valve or other deformable portion or portions 22 can be struck either in a sequential or simultaneous manner to close the valve with a single closing blade or with a plurality of closing blades. According to various embodiments, the valve closing operation can be achieved by contacting the sheet 18 without breaking through the sheet 18. According to various embodiments, the closing blade 26 does not contact material of the substrate 14 that had previously been deformed during a valve opening process. Various embodiments of an exemplary closing blade apparatuses are disclosed in U.S. Provisional Patent Application No. 60/398,777, filed Jul. 26, 2002 and entitled "Closing Blade For Deformable Valve In A Microfluidic Device And Method" to Cox et al., which is incorporated herein in its entirety by reference.

According to various embodiments, the blade tip ends of the deforming blades can be shaped according to the desired type of deformation to be achieved. For example, the shape of the blade tip end can be dependent upon whether a deformable feature such as a valve is to be opened or closed, whether the deforming blade is to be used alone or in tandem with one or more other deforming blades, or whether the valve is to be re-opened or re-closed one or more times.

According to various embodiments, and as shown in FIG. 3, one or more deformable portions or features, such as one or more Zbig valves or other deformable portion or portions 22, for example, can be opened or closed at once, or sequentially, by using a stack of deforming blades 30 arranged next to one another. According to various embodiments, the stack of deforming blades 30 can include a series of opening blades or a series of closing blades, or a combination of opening and closing blades depending upon the timing of the opening and closing operations to be performed. The blades can be operatively disposed in a cartridge 15 and the cartridge 15 can include a biasing device such as a plurality of springs 88, as illustrated in FIG. 3. to normally urge the blades into retracted positions. According to various embodiments, the plurality of springs 88 can be attached to a housing of the cartridge 15, and each of the blades of the stack of deforming blades 30 can be arranged in an abutting relationship with one or two adjacent blades, as shown in FIG. 3, with opening blades or closing blades

12/26 abutting adjacent blades, for example. Alternatively, the deforming blades can be arranged in a spaced-apart relationship to one another, or in a combination of abutting and spaced relationships.

The actuator shown in FIG. 3 is also referred herein as a rolling deforming apparatus, according to various embodiments. The rolling deforming apparatus can include a roller assembly 32 that can be operated to quickly open or close, depending on blade design, a series of Zbig valves or other deformable portion or portions 22, or similar deformable portions or features. According to various embodiments, the rolling deforming apparatus 32 can include a disk-shaped or cylindrical roller 34 having a circular or partially circular pie-shaped cross-section having an outer surface that can operatively contact a deforming blade or a series of stacked deforming blades 30, for example, can contact the opposite or actuating ends 35 of the deforming blades. The deforming blade or series of stacked deforming blades 30 can be arranged in a cartridge 15, for example. For example, the cartridge 15 can allow the deforming blade or blades to be readily inserted and removed therefrom for replacement or removal of one or more blades. The cartridge 15 can include a biasing device such as a plurality of springs 88, one for each deforming blade. The cartridge 15 can include one or wore tracks, grooves, channels, or guides to guide the movement of the deforming blades back and forth between a retracted position and a deforming position.

According to various embodiments, the roller 34 can be in direct rolling contact with the opposite end 35 of each deforming blade, or alternatively, the roller 34 can be arranged to be in rolling contact with at least one intermediate force transferring member, for example, between the roller 34 and a microfluidic card that is to be deformed.

According to various embodiments, each of the blades of the stack of deforming blades 30 can be actuated by rolling the roller 34 over the opposite end, or an actuating end 35, thereof. By way of an actuator mechanism 36 connected to the roller 34 by a bearing connection 38, the roller 34 can be arranged to transmit sufficient force to each of the opposite or actuating ends 35 of the deforming blades to cause the blade tip ends 33 of the deforming blades to move into contact with the microfluidic device 10 and to deform the microfluidic device 10. In this manner, a plurality of deformable features, such as Zbig valves or other deformable portion or portions 22, can be opened or closed in a relatively fast, efficient, and reproducible manner.

According to various embodiments and as shown in FIG. 3, the stack of deforming blades 30 can be biased to be normally urged in a retracted position, by way of a biasing mechanism such as a plurality of springs 88. For example, the plurality of springs 88 can be operable to cause the opposite or actuating ends 35 of the deforming blades 30 to be normally arranged flush with one another. Upon applying an actuating force to the deforming blades 30 with the roller 34, each of the blade tip ends 33 of the deforming blades 30 can be sequentially moved against a biasing force generated by the plurality of springs 88. Furthermore, after elastically deforming the card 10, each of the deforming blades can be sequentially moved back to their initial, non-actuated, and/or refracted position by way of a restoring force generated by the plurality of springs 88. According to various embodiments, a restoring force exerted by one or more components of the microfluidic device 10, such as an elastic, cover layer, for example, can operate as the biasing mechanism or in conjunction with the plurality of springs 88, to force each of the deforming blades back into its initial, non-actuated, retracted, position. The plurality of springs 88 can include at least one elastic element, such as a spring or other mechanism, that can be operatively attached to one or more of the deforming blades.

According to various embodiments, the roller used in various embodiments can be arranged to have a length such that the roller is in the form of an elongated cylinder. Such a cylindrically-shaped roller can be arranged to simultaneously actuate two or more adjacent and/or spaced-apart stacked deforming blades, or two or more series of adjacent and/or spaced-apart stacked deforming blades. According to various embodiments, each blade of the stack of deforming blades 30 can be arranged to have the same or substantially the same pitch as that of a corresponding deformable portion or feature formed in a microfluidic device to be processed. Alternatively, each blade of the stack of deforming blades 30 can be arranged to have a pitch corresponding to a multiple of a pitch of a corresponding deformable feature, for example, each deforming blade can possess a pitch that is two times, three times, four times, or the like, greater than the pitch of corresponding deformable portions or features. According to various embodiments, the stack of deforming blades 30 can be arranged to be spaced-apart by a combination of pitches.

Figure 4A:
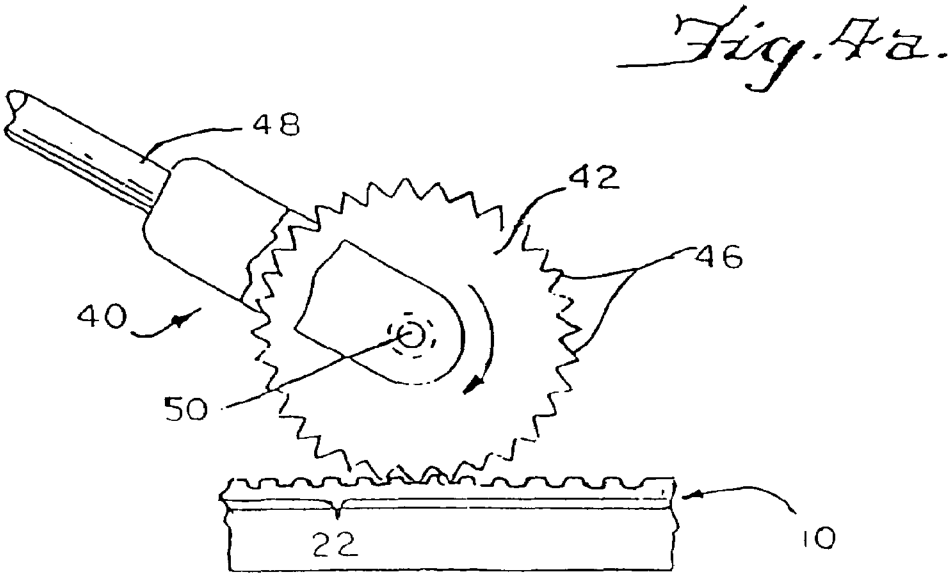
FIGS. 4*a* and 4*b* are a side view and a top view, respectively, of a rolling actuator apparatus according to various embodiments, including a roller assembly that includes a cylindrical roller having a plurality of gear teeth on an outer periphery thereof.
Figure 4B:
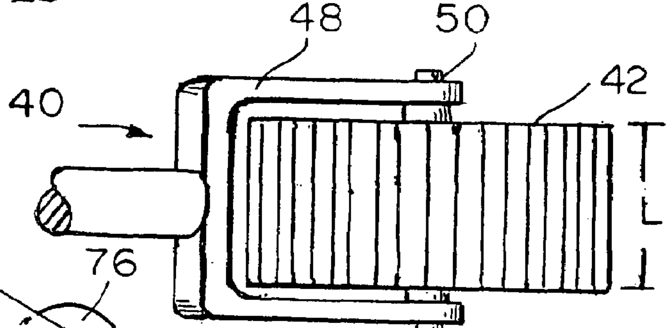

FIGS. 4*a* and 4*b* illustrate various other embodiments of the pivotable actuator. Referring to FIG. 4*a* and according to various embodiments, the pivotable actuator can be in the form of a roller assembly 40 that includes a toothed roller 42 including a disk-shaped or cylindrical roller having a substantially circular cross-section and a plurality of teeth 46 arranged uniformly spaced-apart on the outer periphery of the roller. By way of an actuator mechanism 48, the toothed roller 42 can be arranged to roll over a microfluidic device or card 10 with a force sufficient to cause each tooth 46 to deform the card. For example, each tooth 46 can deform a corresponding deformable portion of a card and open or close, for example, a corresponding Zbig valve or other deformable portion or portions 22, or other deformable feature.

According to various embodiments, each tooth 46 is shaped according to the type of plastic deformation to be performed, i.e., whether a valve closing or opening operation is desired, or whether the tooth 46 is intended to operate alone or in tandem with another tooth or other teeth to achieve a valve opening or closing function. Moreover, according to various embodiments, each tooth 46 can be shaped to possess the same or substantially the same pitch as that of a corresponding feature or valve formed in the microfluidic device. Alternatively, each tooth 46 can be shaped to possess a pitch corresponding to a multiple of the pitch of a corresponding feature, for example, a pitch that is two times, three times, four times, or the like, greater than the pitch of corresponding deformable portions of a microfluidic device.

FIG. 4*b* illustrates a top view of the roller assembly 40 and shows the use of a bearing connection 50 between the actuator 48 and the toothed roller 42. According to various embodiments, the bearing connection 50 can be any type of force transmitting connection mechanism that operates to rotatably connect the toothed roller 42 to the actuator 48, such as, for example, a journal bearing, a roller bearing, an axle, a pivot pin, or the like.

According to various embodiments, the roller of the roller assembly described herein can be arranged to have a length such that the roller forms an elongated cylinder. As a result, a plurality of rows of teeth can be arranged along the outer periphery of the roller. Such a cylindrically-shaped roller can be arranged to simultaneously deform, for example, more than one deformable portion or feature. Referring to FIG. 4*b*, according to various embodiments the toothed roller 42 is shown formed as a cylinder having a length, L, and can be arranged to include a second row of teeth on an outer periphery thereof.

Figure 5:
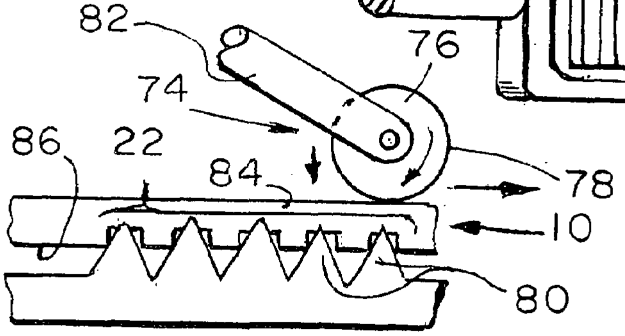
FIG. 5 is a side view of a rolling actuator apparatus according to various embodiments, including a roller assembly that includes a partially wedge-shaped roller having a plurality of blade tip ends on an outer periphery thereof.

FIG. 5 illustrates further embodiments of the teachings herein. The pivotable actuator 52 can comprise a toothed roller 56 having a partially circular cross-section, for example, a pie-shaped cross-section. The arc formed by the toothed roller 56 can range from about 45° up to about 360°, and can be less than 90°, for example. A plurality of teeth 58 can be attached to, or integrally formed as part of, an outer periphery of the toothed roller 56. The blade tip ends of the deforming blades can merge into a common pivotable actuator, for example, as shown in FIG. 5. The plurality of blade tip ends can include a plurality of teeth that merge together as illustrated in FIG. 5. Furthermore, according to various embodiments, the toothed roller 56 can be attached to an actuator mechanism 60 by way of a bearing connection 62, or an equivalent force transmitting connection mechanism. The actuator mechanism 60 can be arranged to transmit a force to the toothed roller 56 to cause it to roll over a microfluidic device or card 10 with a downward force sufficient to cause each tooth 58 to deform the microfluidic device 10 and, for example, open or close a corresponding Zbig valve or other deformable portion or portions 22, or other deformable portion or feature such as a valve. Similar to the embodiments shown in FIGS. 4*a*–4*b*, each tooth 58 of the toothed roller 56 can be shaped according to the type of deformation to be performed, for example, whether a valve closing or valve opening operation is desired, or whether the tooth is to operate alone or in tandem with other teeth to perform an opening or closing function. Furthermore, each tooth 58 can possess the same pitch or a multiple of a pitch, of a corresponding deformable portion or feature such as a valve.

Figure 6:
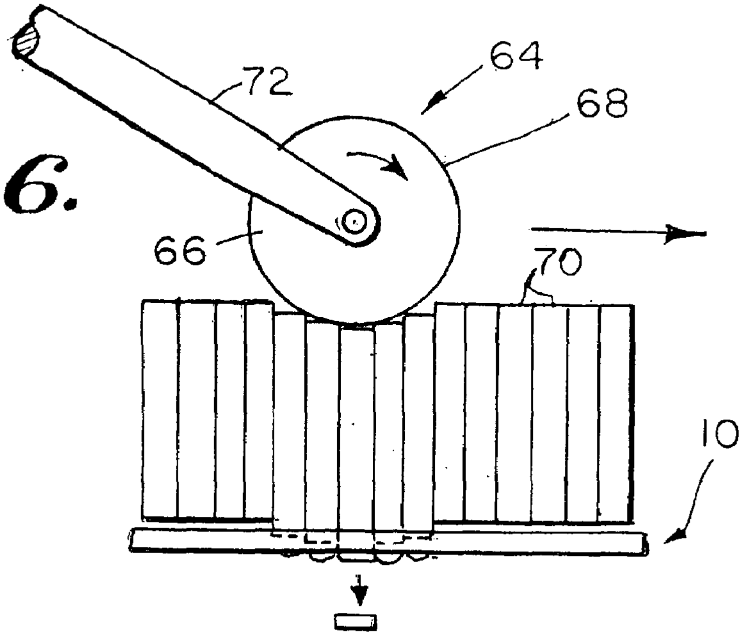
FIG. 6 is a side view of a rolling actuator apparatus according to various embodiments, including a roller assembly that includes a cylindrical roller, and a plurality of hole-punches for sequentially punching-out respective portions of a microfluidic device.

FIG. 6 illustrates yet further embodiments of a pivotable actuator according to various embodiments. According to various embodiments, the pivotable actuator 64 can include a disk-shaped or cylindrical roller 66 having an outer actuating surface 68 which can be in operative contact with displaceable deforming blades that are in the form of a plurality of hole-punches 70. By way of an actuator mechanism 72, the roller 66 can be arranged to roll over the opposite ends 71 of the hole-punches 70 with sufficient force to displace the hole-punches 70 a particular distance and into contact with a microfluidic device 10, such that a corresponding piece of the microfluidic device can be displaced or punched out of the microfluidic device 10. In such a manner, a plurality of corresponding deformable features, such as Zbig valves or other deformable portion or portions 22, can be opened or closed or actuated in a relatively fast, efficient, and reproducible manner. Alternatively, the roller 66 can be arranged to be in rolling contact with at least one intermediate force transferring member, for example, and the force of the roller 66 can therefore be transmitted to the opposite ends 71.

According to various embodiments, each hole-punch 70 can be arranged to have substantially the same pitch as that of corresponding deformable portion or portions 22 of the mircofluidic device. Alternatively, each hole-punch 70 can be arranged to have a pitch corresponding to a multiple of a pitch of corresponding deformable portions. Moreover, the plurality of hole-punches 70 can be arranged spaced by a combination of pitches.

According to various embodiments, each of the hole-punches 70 of the plurality of hole-punches can be arranged in an abutting relationship to one another, as shown in FIG. 6, or alternatively, the hole-punches 70 can be arranged in a spaced relationship. Moreover, the hole-punches 70 can be arranged in a combination of abutting and spaced relationships.

Figure 7:
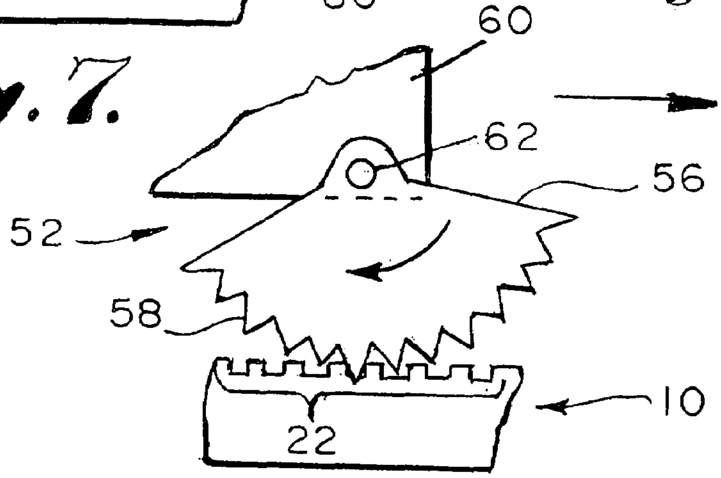
FIG. 7 is a side view of a rolling actuator apparatus according to various embodiments, including a roller assembly that includes a cylindrical roller positioned on a first side of a microfluidic device, and a plurality of longitudinally arranged deforming blades in a unitary construction arranged on a second side of the microfluidic device.

FIG. 7 illustrates yet further embodiments of a deforming system according to various embodiments wherein a pivotable actuator is operatively positioned on one side of a microfluidic device, and the opposite side of the device is placed in contact with a plurality of deforming blades. A pivotable actuator can be provided in the form of a roller assembly 74 and can comprise a disk-shaped or cylindrical roller 76 having an outer actuating or contact surface 78 that can be in operative contact with a backside 84 of a microfluidic device 10. The backside 84 of the microfluidic device can be free of portions to be deformed, such as, for example, Zbig valves or other deformable portion or portions 22. The opposite side 86 of the card can be provided with deformable portion or portions 22 formed therein or thereon, such as, for example, as shown in FIG. 7. The side 86 can be placed into contact with a plurality of longitudinally arranged teeth 80. By way of an actuator mechanism 82, the roller 76 can be arranged to roll over the backside 84 of the microfluidic device 10 with sufficient force to cause the teeth 80 with sufficient force to deform the card, thereby opening or closing corresponding Zbig valves, for example, or other deformable portion or portions 22. In such a manner, a plurality of Zbig valves or other deformable portion or portions 22 formed on the microfluidic device 10 can be manipulated in a relatively fast, efficient, and reproducible manner.

According to various embodiments, the longitudinally arranged teeth 80 can be arranged in a row along a planar plate or bar. Moreover, the plate or bar can comprise a plurality of laterally spaced-apart rows of teeth 80 such that a series of deformable valves can be actuated simultaneously by a cylindrically shaped circular roller 76, for example. According to various embodiments, each of the teeth 80 can be arranged to have substantially the same pitch as that of a corresponding deformable feature formed on the microfluidic device. Alternatively, each of the teeth 80 can be arranged to have a pitch corresponding to a multiple of a pitch of a corresponding deformable feature. Moreover, the teeth 80 can be arranged to have a combination of pitches.

According to various embodiments, the actuating mechanism 82 can be arranged to roll the roller across the card at various speeds depending upon the desired speed at which the deformable portions, features, or valves are to be actuated. Moreover, according to various embodiments, the actuating mechanism can be arranged to exert varying amounts of force depending on the desired amount of deformation to be imparted to the card and the desired speed at which the roller rolls across the card.

According to various embodiments, the teeth and/or hole-punches exemplified by the foregoing embodiments can be replaced by needles or other devices having shapes capable of deforming deformable portions of a microfluidic device or card.

According to various embodiments, the pivotable actuator can be used with the opening or closing blades, or the microfluidic systems described in the applications identified above in the Cross-Reference To Related Applications section of the present disclosure, the contents of which are incorporated herein in their entireties by reference.

Those skilled in the art can appreciate from the foregoing description that the present teachings can be implemented in a variety of forms. Therefore, while these teachings have been described in connection with particular embodiments and examples thereof, the true scope of the present teachings should not be so limited. Various changes and modifications may be made without departing from the scope of the teachings herein.

The invention claimed is:

1. In combination:

a microfluidic device including a substrate, a first surface, and a plurality of fluid pathways, each pathway including at least one deformable portion:

a plurality of deforming blades, each deforming blade including a blade tip end and an opposite end: and a pivotable actuator, the pivotable actuator including a presser member capable of pivoting about an axis of rotation to actuate the plurality of deforming blades to contact or separate from contact with to microfluidic device:

wherein the plurality of deforming blade tip ends are each spaced a first distance from one or more adjacent blade tip ends, and each of the plurality of deformable portions is spaced the first distance from one or more adjacent deformable portions of one or more adjacent pathways of the plurality of the pathways, wherein the microfluidic device includes a plurality of sample wells in selective fluid communication with the fluid pathways formed in the substrate, and the deformable portion of each pathway is selectively capable upon activation by the at least one of the plurality of deforming blade tip ends of controlling fluid movement through the respective pathway.

2. In combination:

a microfluidic device including a substrate, a first surface, and a plurality of fluid pathways, each pathway including at least one deformable portion:

a plurality of deforming blades, each deforming blade including a blade tip end and an opposite end, wherein the respective opposite ends of the plurality of blade tips are separated from one another and each is seperately movable relative to the other opposite ends; and a pivotable actuator, the pivotable actuator including a presser member capable of pivoting about an axis of rotation to actuate the plurality of deforming blades to contact or separate from contact with to microfluidic device:

wherein the plurality of deforming blade tip ends are each spaced a first distance from one or more adjacent blade tip ends, and each of the plurality of deformable portions is spaced the first distance from one or more adjacent deformable portions of one or more adjacent pathways of the plurality of the pathways, wherein the plurality of blade tips are arranged adjacent one another in a cartridge.

3. The combination of claim 2, wherein the cartridge comprises a biasing device that maintains the blade tips in a retracted position.

4. The combination of claim 3 where the biasing includes a plurality of springs.

5. The combination of claim 2 wherein the presser member includes a roller, the plurality of blade tips are arranged in a linear array in the cartridge, and the opposite ends of the respective blades tips in the cartridge to be capable of being actuated by the roller.

6. The combination of claim 5 wherein the roller is cylindrical.

7. A deforming system comprising:

a cartridge;

a plurality of deforming blades arranged adjacent one another in the cartridge, each deforming blade including a blade tip and an opposite end; and a presser member pivotable about an axis of rotation and arranged with respect to the cartridge each that upon pivoting about the axis of rotation the presser member is capable of contacting the opposite ends of the plurality of deforming blades to actuate the plurality of the deforming blades to contact or separate from contact with one or more adjacent pathways of a plurality of pathways in a microfluidic device.

8. The deforming system of claim 7, wherein the cartridge includes a biasing device to normally maintain the plurality of deforming blades in respective retracted positions, the presser member includes a roller, and the cartridge includes a track for guiding the roller into contact with the respective opposite ends of the deforming blades.

9. The deforming system of claim 7, wherein the plurality of deforming blades includes a plurality of hole-punches.

10. A method of processing a microfluidic device, comprising:

providing a microfluidic device that includes a plurality of pathways, each of the pathways comprising a respective deformable portion;

providing a deforming assembly adjacent a surface of the microfluidic device, the deforming assembly including a plurality of deforming blades arranged adjacent one another in a cartridge, and a presser member that includes a roller, wherein each deforming blade includes a blade tip and an opposite end opposite the blade tip, and the opposite ends of the respective blade tips are arranged in the cartridge in positions whereby the opposite ends are capable of being actuated by the roller, and rolling the roller against the opposite ends arranged in the cartridge with a force sufficient to cause the plurality of blade tips to contact and deform the deformable portions of one or more adjacent pathways of the plurality of pathways.

11. The method of claim 10, wherein the plurality of blade tips are spaced a first distance apart from one another, and the plurality of deformable portions are spaced the first distance apart from one another.

12. The method of claim 10, wherein the microfluidic device includes a plurality of fluid flow pathways and each of the plurality of deformable portions at least partially defines a respective one of the pathways.

13. The method of claim 12, wherein each of the plurality of deformable portions comprises a respective intermediate wall along a respective pathway of the plurality of pathways.

14. The method of claim 12, wherein the method includes permanently deforming each of the plurality deformable portions.

15. The method of claim 10, wherein the microfluidic device includes an elastically deformable cover layer and a substrate, and the substrate includes the plurality of deformable portions.

16. In combination:

a microfluidic device including a substrate, a first surface, and a plurality of fluid pathways, each pathway including at least one deformable portion;

a plurality of deforming blades, each deforming blade including a blade tip end having a blade tip, and an opposite end, wherein the respective opposite ends of the plurality of deforming blades are separate from one another and each is separately movable relative to the other opposite ends, wherein the plurality of blade tip ends are arranged adjacent one another in a cartridge, the cartridge comprising a biasing device including a plurality of springs, the biasing device maintaining the blade tip ends in a retracted position;

a pivotable actuator, the pivotable actuator including a presser member capable of pivoting about an axis of rotation to actuate the plurality of deforming blades to contact or separate from contact with the microfluidic device;

wherein the plurality of deforming blade tip ends are each spaced a first distance from one or more adjacent blade tip ends, and the plurality of deformable portions are each spaced the first distance from one or more adjacent deformable portions.

17. A deforming system comprising:

a cartridge, the cartridge including a biasing device;

a plurality of deforming blades arranged adjacent one another in the cartridge, each deforming blade including a blade tip and an opposite end, the biasing device normally maintaining the plurality of deforming blades in respective retracted positions; and a presser member, the presser member including a roller and being pivotable about an axis of rotation and arranged with respect to the cartridge such that upon pivoting about the axis of rotation the presser member is capable of contacting the opposite ends of the plurality of deforming blades to actuate the plurality of the deforming blades, wherein the cartridge includes a track for guiding the roller into contact with the respective opposite ends of the deforming blades.

* * * * *